(12) United States Patent
Howe (10) Patent No.: US 9,805,415 B2
(45) Date of Patent: Oct. 31, 2017

(54) TRANSACTION LINKED MERCHANT DATA COLLECTION

(71) Applicant: MasterCard International Incorporated, Purchase, NY (US)

(72) Inventor: Justin Xavier Howe, Oakdale, NY (US)

(73) Assignee: MasterCard International Incorporated, Purchase, NY (US)

( * ) Notice: Subject to any disclaimer, the term of this patent is extended or adjusted under 35 U.S.C. 154(b) by 159 days.

(21) Appl. No.: 13/894,253

(22) Filed: May 14, 2013

(65) Prior Publication Data

US 2014/0344040 A1 Nov. 20, 2014

(51) Int. Cl.
G06Q 40/00 (2012.01)
G06Q 30/02 (2012.01)

(52) U.S. Cl.
CPC ......... *G06Q 40/00* (2013.01); *G06Q 30/0222* (2013.01)

(58) Field of Classification Search
CPC ........ G06Q 20/04; G06Q 40/02; G06Q 40/00; G06Q 30/0222
USPC ..................................................... 705/35–40
See application file for complete search history.

(56) References Cited

U.S. PATENT DOCUMENTS

| | | | |
|---|---|---|---|
| 7,353,184 B2* | 4/2008 | Kirshenbaum | .... G06Q 30/0204 705/7.33 |
| 8,245,920 B1 | 8/2012 | Katyal et al. | |
| 8,296,229 B1 | 10/2012 | Yellin et al. | |
| 9,105,059 B2* | 8/2015 | Gluzberg | ............... G06Q 30/06 |
| 9,195,984 B1* | 11/2015 | Spector | ................ G06Q 20/367 |
| 2003/0065595 A1* | 4/2003 | Anglum | ................ G06Q 30/02 705/35 |
| 2004/0117261 A1* | 6/2004 | Walker | ................ G06Q 20/105 705/14.13 |
| 2007/0094137 A1 | 4/2007 | Phillips et al. | |
| 2009/0307028 A1* | 12/2009 | Eldon et al. | ....................... 705/7 |
| 2011/0055005 A1* | 3/2011 | Lang | .......................... 705/14.45 |
| 2012/0084199 A1* | 4/2012 | Stone | .................... G06F 17/243 705/39 |
| 2012/0197742 A1* | 8/2012 | Johnson | .......................... 705/16 |

(Continued)

OTHER PUBLICATIONS

Middleton, "Shopper, undercover";. Knight Ridder Tribune Business News; Washington, Jun. 18, 2006.*

*Primary Examiner* — Edward Baird
(74) *Attorney, Agent, or Firm* — Budzyn IP Law, LLC (57) ABSTRACT

A system, method, and software product for obtaining details on merchant data from customers purchasing goods or services at a merchant with a payment instrument. After customers make purchases, a server associated with a payment instrument network or payment instrument issuing bank sends a message in the form of a signal to open an application, an SMS, an e-mail, an electronic bank statement, or other electronic means to the customer offering the customer the opportunity to provide details on merchant data on the merchant where the purchase was just made, including the name and address of the merchant where the purchase was just made. The customer may be offered rewards for providing of details on merchant data. The payment instrument network and payment instrument issuing bank are thus presented with the opportunity to mine data in a crowdsourced manner from consumers who have just purchased from a merchant.

16 Claims, 8 Drawing Sheets

(56) References Cited

U.S. PATENT DOCUMENTS

| | | |
|---|---|---|
| 2013/0018781 A1 | 1/2013 | Prada Peyser et al. |
| 2013/0221093 A1* | 8/2013 | Patel ..................... G06Q 20/02 |
| | | 235/379 |
| 2014/0025461 A1* | 1/2014 | Knowles et al. .......... 705/14.23 |
| 2014/0214518 A1* | 7/2014 | Hatch ................ G06Q 30/0225 |
| | | 705/14.34 |
| 2014/0358947 A1* | 12/2014 | Hong ................ G06F 17/30864 |
| | | 707/751 |

* cited by examiner

TRANSACTION LINKED MERCHANT DATA COLLECTION

FIELD OF THE INVENTION

The present disclosure relates to data mining from payment transaction records transmitted through a payment instrument network. More specifically, disclosed is a system, method, and software product for matching of payment transactions made with payment instruments processed through a payment instrument network to data provided regarding a merchant where the transaction was made via an application available on customers' personal computing devices or similar means. The collection of data from numerous customers on a multitude of merchants allows for so-called "crowdsourced" data collection from numerous willing participants. As payment transaction records are matched to the merchant where the transaction is completed, a more complete picture of such activity is formed, including names and addresses of merchants where customers make purchases using their payment instruments.

BACKGROUND OF THE INVENTION

A payment instrument issuer invests substantial resources to correctly identify which merchant is associated with each payment transaction. Payment transaction records are typically forwarded to the payment instrument issuer network by the merchant acquiring bank ("Acquirer") associated with a merchant in determining whether to approve or disapprove of a transaction. Though on its face, this may appear to be a trivial task, often, records of transactions forwarded to the payment instrument network list solely an address, a phone number, or a unique number known only to the Acquirer in seeking approval, and little information may exist as to the merchant that originated the transaction.

As a brief overview of the process of completing a transaction, as payments are processed through a payment instrument network, a payment instrument holder or customer (associated with a credit card, debit card, ATM card, electronic wallet, transponder device, NFC-enabled smart phone, or similar payment instrument existing currently or yet to be invented) makes a payment to a merchant or withdraws money from an ATM associated with a transaction acquiring device (such as a point-of-sale device accepting credit cards). An Acquirer seeks approval for this transaction by retransmitting certain data to a payment instrument network associated with a payment instrument issuing bank. If approval is appropriate, a reply message is transmitted from the payment instrument issuing bank to the Acquirer which is then forwarded to the merchant indicating the transaction is approved. Relevant technical standards governing this process are discussed in ISO 8583, and that document is incorporated herein in its entirety.

Historically, even though payment instrument issuing banks are tasked with approval or disapproval of a transaction, payment instrument issuing banks do not have access to all the details regarding the transaction sometimes even including the name of the merchant, the location of the transaction, and other miscellaneous details. In practice, however, various data mining techniques are available to determine a large amount of information regarding the transaction. Such mined data is useful to both the customers and payment instrument issuing bank in fraud prevention, potential risk associated with a transaction, actuarial assessments of transactions, and many other ways.

Often, however, matching of the merchant where a transaction was entered with the payment instrument used in entering a transaction requires a significant commitment of employee time for the payment instrument issuing bank. Dozens of employees can be employed full-time combing through data and making connections, even with the help of computers. Accordingly, there is a continuing need for a method, system, and software product for properly matching payment transaction records processed through a card network to a merchant.

SUMMARY OF THE INVENTION

The present invention provides a method, system, and software product for determining the name, physical address, phone number, and other pertinent details of a merchant associated with a payment transaction. The present invention additionally provides a method, system, and software product for customers to enter details regarding the merchant data for the transaction he or she is entering, in particular the name of the merchant and the address, with such information being used by the payment instrument issuer for maintenance of statistics (including for such purposes as tax filing), fraud prevention, and other purposes. Customers benefit by being able to access enhanced data regarding their purchases, in addition to other benefits, such as data storage for filing of taxes. Such information is aggregated and stored in a database by customers. The information is transmitted from a number of customers making purchases, as it results from details on merchant data entered by a number of customers on a number of merchants soon after a payment transaction is completed, allowing customers to provide the most recent and accurate data.

In accordance the first aspect of the present invention, a method, system, and software product is presented for a multitude of customers to upload data to a server via an application installed on customers' personal computing devices after completing their transaction. Customers elect to have the application installed on their personal computing devices (including cellular telephones, PDAs, lap-top computers, personal computer, tablet computers, and pagers). After installation, the system, method, and computer product of the present invention will monitor for completed financial instrument transactions, and after they are made may prompt and message the customer for details on merchant data regarding where the purchase was made. In alternate embodiments, instead of an application installed on their personal computing devices, customers may be presented with an online bank statement, an SMS, an e-mail, or even a telephone call to which the customer can respond and provide pertinent details on merchant data. Customers are typically messaged for merchant details soon after completing a transaction, but in some embodiments are prompted some time later and are able to respond on their own time. Servers and databases which power the presently disclosed invention are capable in one embodiment of selectively transmitting messages querying for details on merchant data to merchants where such data is most in demand for, and maintaining a count of how many customers have provided data regarding a merchant. Customer may but do not necessarily need to have their personal computing devices on their person while shopping, as messages querying as to the details of a merchant can be transmitted after the actual transaction is completed. In an embodiment, if such a number of customers that has provided details on merchant data is greater than a certain value, the present invention may stop transmitting messages to customers who have shopped there for further details on merchant data.

In accordance with a second aspect of the present invention, customers may receive rewards for the details on merchant data they provide, including points to add to a rewards account for claiming larger prizes, cash prizes immediately redeemable, gift cards, and merchandise. By incentivizing the provision of details on merchant data, customers are encouraged to provide such data in an expeditious fashion. Larger incentive awards may be provided for hard-to-obtain data.

In accordance with a third aspect of the present invention, the server associated with the database only messages customers for data when a predefined template of details contained in the database for a merchant is not complete. The predefined template of details for a merchant is not complete when, for example, a transaction does not including all predefined requirements, such as a name of merchant, address of merchant, type of goods or services sold, and "channel" used to process the transaction (whether it is eCommerce, ATM, PIN Debit, Face to Face, or another means). If the server determines that the predefined template of details is not complete for a merchant, the server may transmit a message to the customer seeking details on merchant data lacking from the predefined template of details. This aspect of the invention allows for a more directed approach, in terms of number of messages sent and amount of details on merchant data collected from customers.

In addition to the above aspects of the present invention, additional aspects, objects, features, and advantages will be apparent from the embodiments presented in the following description and in connection with the accompanying drawings.

BRIEF DESCRIPTION OF THE DRAWINGS

Some embodiments are illustrated by way of example and not limitation in the figures of the accompanying drawings, in which like reference numerals refer to like structures across the several views, and wherein.

DETAILED DESCRIPTION OF THE EMBODIMENTS

The following sections describe exemplary embodiments of the present invention. It should be apparent to those skilled in the art that the described embodiments of the present invention are illustrative only and not limiting, having been presented by way of example only. All features disclosed in this description may be replaced by alternative features serving the same or similar purpose, unless expressly stated otherwise. Therefore, numerous other embodiments of the modification thereof are contemplated as falling within the scope of the present invention as defined herein and equivalents thereto.

Throughout the description, where items are described as having, including, or comprising one or more specific components, or where methods are described as having, including, or comprising one or more specific steps, it is contemplated that, additionally, there are items of the present invention that consist essentially of, or consist of, the one or more recited components, and that there are methods according to the present invention that consist essentially of, or consist of, the one or more recited processing steps.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may generally be referred to herein as a "server," "computing system," "computer system," "system," etc. It is commonly known in the art these devices are associated with one or more processors or central processing units. Furthermore, the present invention may take the form of a computer program product embodied in any tangible medium of expressing having computer usable program code embodied in the medium.

Computer program code or applications for carrying out operations of the present invention may be written in any combination of one or more programming languages, including an object-oriented programming language such as Java, Smalltalk, C++, or the like and conventional procedural programming languages, such as Visual Basic, "C," or similar programming languages. The program code or application may execute entirely on the customer's, payment instrument holder's, or user's personal computing device, partly on the user's personal computing device, as a stand-alone software package, partly on the user's personal computing device and partly on a remote server and/or other computing device, or entirely on the remote computer or server.

The present invention is described below with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer programmable instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provides processes for implementing the functions/acts specified in the flowchart and/or block diagram block or blocks.

Figure 1:
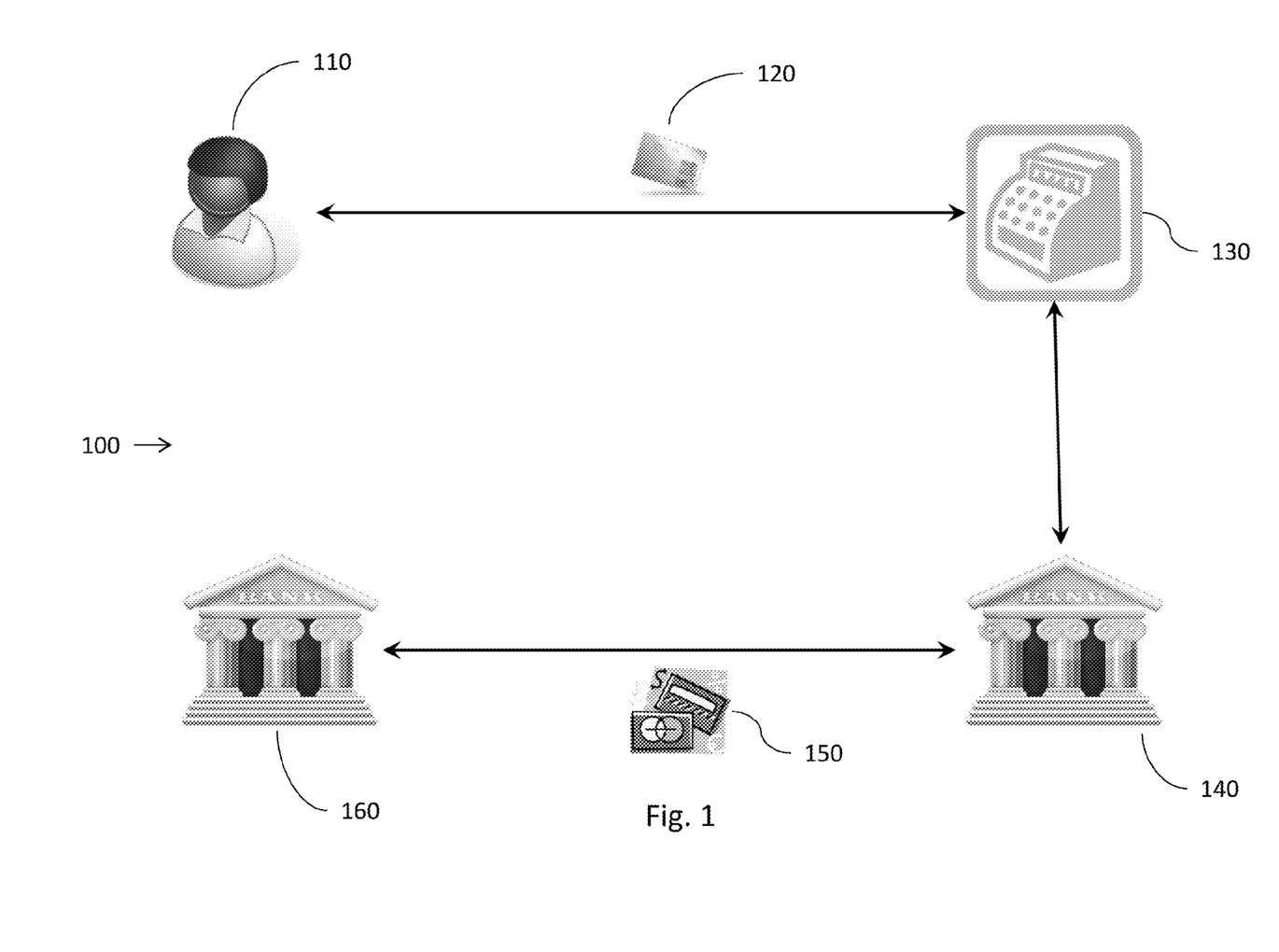
FIG. 1 illustrates a block diagram displaying the process of completing a payment transaction.

Referring to FIG. 1, there is shown a block diagram 100 displaying the process of completing a payment transaction as a matter of background. A "customer" (also known as a "payment instrument holder") 110 desires to purchase a good or service from a merchant 130. Customer 110 presents a payment instrument 120 (such as a credit card, debit card, electronic wallet, transponder device, NFC-enabled smart phone, or similar current or after-arising technology) to the merchant 130 for payment. The merchant 130 utilizes his or her transaction acquiring device (not shown) to communicate with a merchant acquiring bank or Acquirer 140 seeking approval for this transaction. The Acquirer 140 transmits customer 110's account information (including account number and amount), seeking approval of the transaction as an authorization message formatted in accordance with ISO 8583 (which is incorporated herein its entirety) or its equivalent, to a payment instrument network 150 and a payment instrument issuing bank 160 associated with the payment instrument 120. Should approval be appropriate, the payment instrument issuing bank 160 transmits an approval message via the payment instrument network 150 to the Acquirer 140 who then retransmits the approval message to the merchant 130, who thusly learns the sale has been completed. As previously, the approval message is transmitted per known methods.

As one skilled in the art knows, the payment instrument issuing bank 160 does not always know the identity of the merchant 130 associated with the transaction. Limited data is sometimes available, such as a phone number, city, and state, etc., but even this information can be deceptive. If, for example, the merchant 130 is a large, national retail chain with centralized customer service, all of the transactions might be labeled as being processed at the customer service address and phone number, thus appearing to have occurred in a different location. Various prior-art techniques exist for the mining of this data, but the present invention offers a superior alternative.

Figure 2:
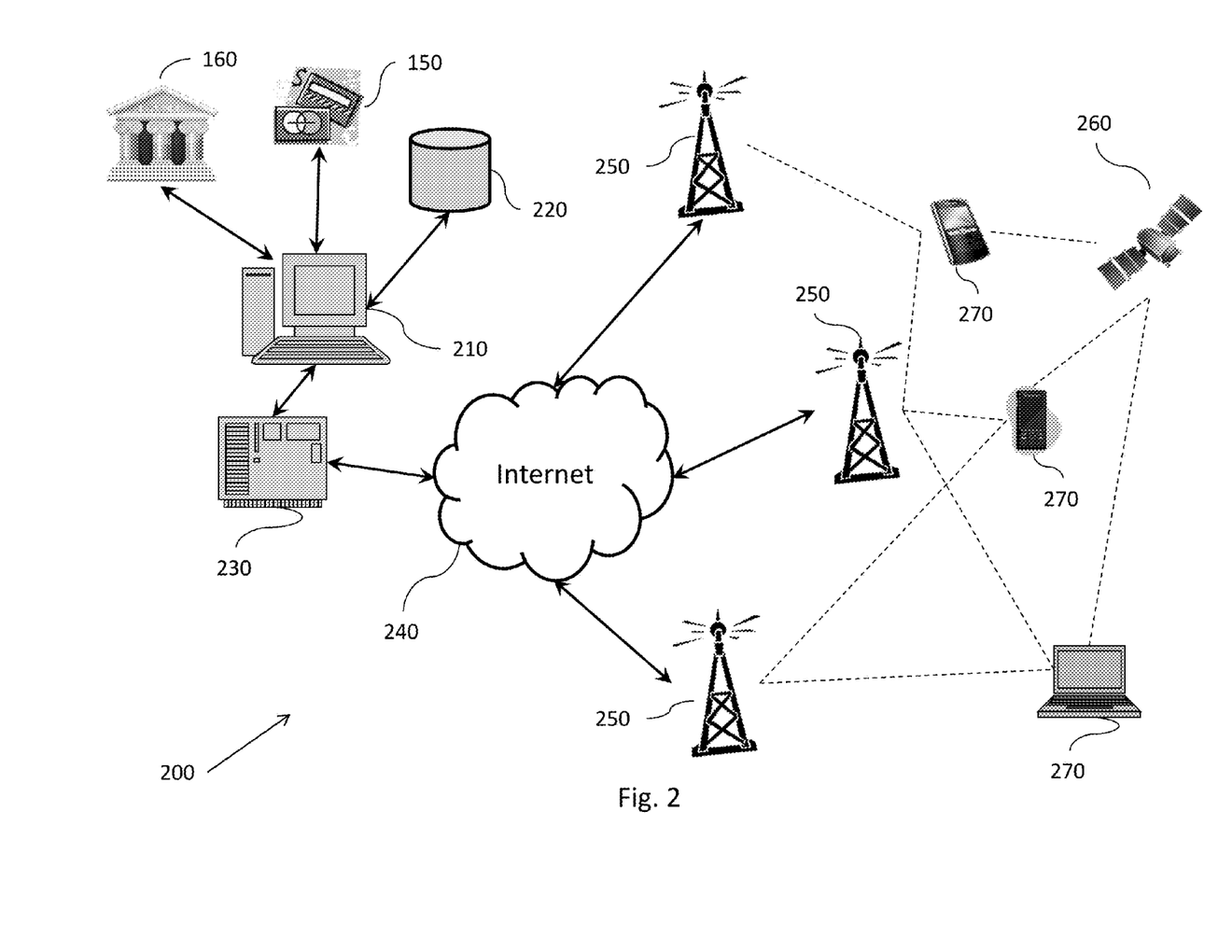
FIG. 2 illustrates a block diagram of a system utilizing the present invention.

Referring to FIG. 2, shown is a block diagram 200 of a system in which aspects of the present invention may be implemented. Payment instrument issuing bank 160 and/or payment instrument network 150 maintain a single or multiple server 210 computer systems (which are implemented by standard rack servers, Ozeki® Message Servers, or even a general purpose computer device), associated with an SQL-backed database 220 (or equivalent relational database) and an integrated or stand-alone network interface 230 which provides access to the internet 240 for global connectivity with a plurality of customers associated with personal computing devices 270. Personal computing devices 270 include cellular telephones, personal digital assistants, lap-top computers, personal computers, tablet computers, pagers, and the like. The plurality of personal computing devices 270 are in communication with cell-phone towers 250 for the purposes of providing connectivity to the internet 240. The geolocation of the personal computing devices 270 may also be tracked dynamically via triangulation between cell phone towers 250 or by connection with a GPS-satellite 260 via an internal GPS receiver built into the personal computing devices 270. Typically, the server 210 associated with the network interface 230 provides a means by which a message is transmitted to personal computing devices 270 querying as to the details relating to completed payment transactions but other means are possible. Geolocation can be tracked via longitude and latitude, via street address (such as 100 Spring Garden, Philadelphia, Pa., etc.), or any other means.

In one embodiment, an application (not shown) executing fully or in-part on the personal computing devices 270 provides a means by which customers respond to the message and provide the name, address, and other pertinent information to the payment instrument issuing bank 160 and/or payment instrument network 150 regarding merchants where they shop. In alternate embodiments, customers' personal computing devices are presented with a webpage, applet, or electronic bank statement as a means through which such data can be provided in real-time, soon after a payment transaction is completed. In yet another embodiment of the invention a cardholder's geolocation is continuously transmitted via an application executing on customer's personal computing device, allowing the geolocation of each transaction to be tracked and messages querying as to details on merchant data are submitted to the customer at a later time. In some embodiments of the present invention, after financial instrument transactions are processed the server does not transmit a request for information immediately, an e-mail, SMS, telephone call, voice mail, or other means requesting information on a payment transaction is not sent immediately but rather after several such transactions have been completed, and the customer can respond to them all at a later time.

The database 220 maintains an information data set on a number of merchants. As the number of merchants in the world numbers in the millions, this dataset can be extremely large and require enormous hardware resources to maintain. In various embodiments the information dataset includes some or all merchant details including merchant name, merchant address, and merchant phone number for every merchant accepting the payment instrument 120 in question.

The server 210 also tracks completed payment transactions processed at the payment instrument issuing bank 160 or payment instrument network 150 and maintains them as payment transaction records. Contained is relevant information on the transaction including the customer identification of the payment instrument holder, the amount of the transaction, etc.

As will be discussed further herein, in one embodiment as customers purchase goods from merchants, an application or browser window on their personal computing devices 270 prompts them for information regarding the merchant where they made their purchase, including but not limited to such details as name of the merchant, address, type of goods purchased, and the "channel" used to process the transaction (such as via eCommerce, ATM, PIN Debit, Face to Face, or another means). This information, once obtained from the customers is transmitted from their personal computing devices 270 via the cell phone towers 250 to the internet 240 and thereby transmitted to the network interface 230 associated with the server 210 maintained by the payment instrument issuing bank 160 and/or payment instrument network 150. Such information can then be stored on the database 220 and analyzed, accessed, and made available to those requiring the information in any of a variety of ways.

In other embodiments instead of being presented with an application or browser window, customers will be sent a bank statement form, an e-mail, SMS text, or even an automated voicemail call or voicemail message, any of which can be responded to in order to provide the requested data.

In various embodiments of the presently disclosed invention after the requested pertinent information on the merchant where the purchase was made is provided, server 210 will present a link to the customer allowing claiming of a prize. The link can be available via a browser window, an incoming SMS message, an e-mail, or other electronic means. Prizes can include a number of points added to an account through which "purchases" can be made of awards such as plane tickets, consumer merchandise, vacations, or cash awards. Prizes can also include cash prizes, gift cards, or merchandise immediately redeemable. Prizes incentivize customers to provide requested data, and in the cases of merchants where data has been difficult to obtain, prizes can be increased to further incentivize the providing of data. In certain embodiments faster responses equate to more valuable prizes.

Figure 3:
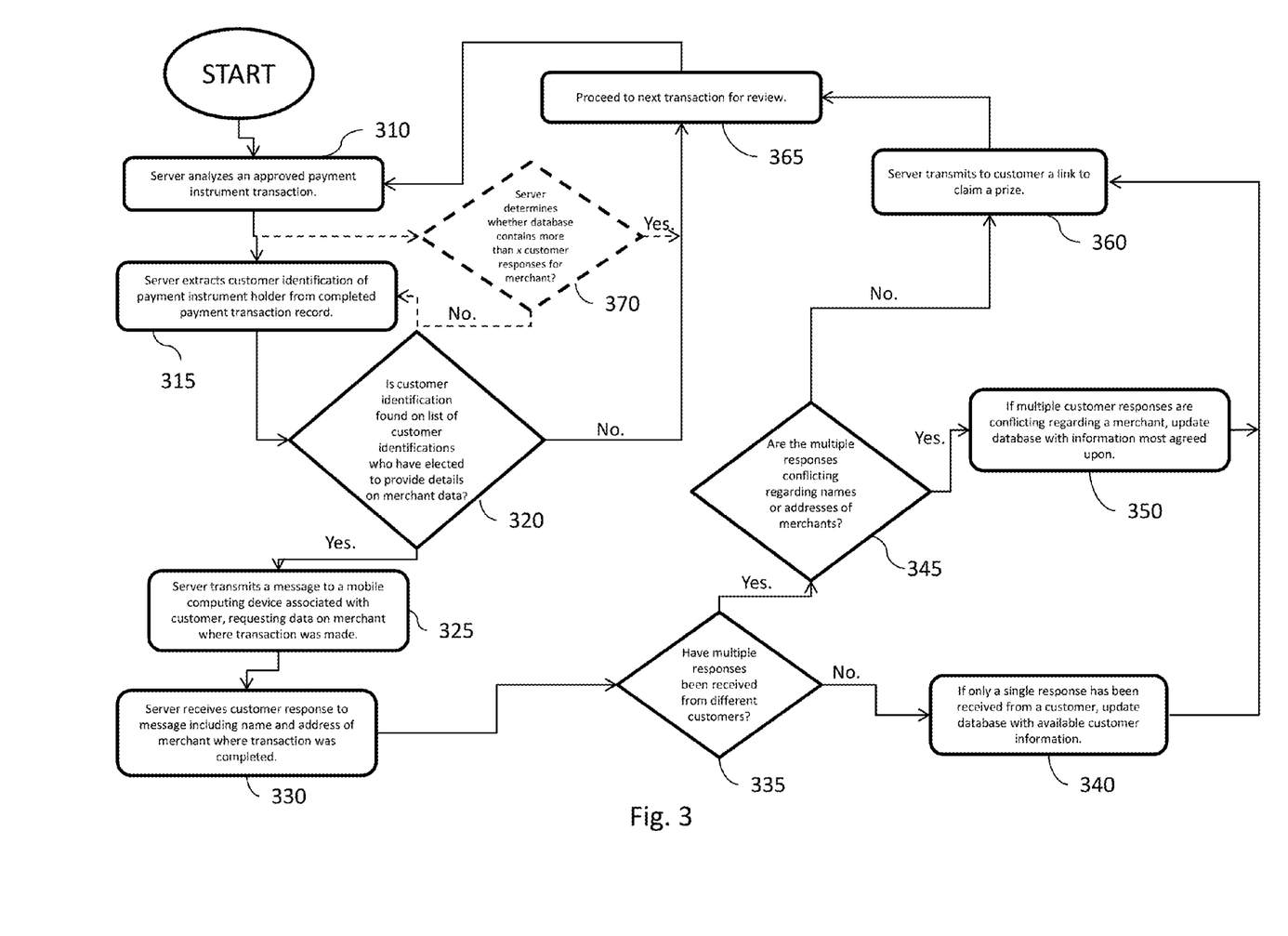
FIG. 3 illustrates a flow chart displaying basic steps of embodiments of the invention.

Referring to FIG. 3, there is shown a flow chart displaying basic steps of an embodiment of the invention, as described above. The server 210 analyzes a completed payment transaction at step 310 and extracts the customer identification from the completed payment transaction record at step 315. The server 210 compares the customer identification associated with the payment instrument holder with a list of customers who have consented to provide details on merchant data on the merchant where a purchase was made at step 320. The customer identification is a unique number (e.g. an account number) used by the payment instrument network 150 or the payment instrument issuing bank 160 to identify the customer's account. If the customer has not consented to provide details on merchant data on the locations where he or she shops, execution proceeds to analyzing the next transaction at step 365. If the customer has consented to provide details, the server 210 transmits a message to the customer enrolled in the promotion requesting data on the transaction at step 325. The message takes the form of a signal to open an application residing partially or fully on the personal computing device 270 of the customer. In other embodiments the message takes the form of a link to a webpage, an applet which allows the customer to enter data into a webpage, or even other forms including an e-mail, an SMS message, a voicemail message, or a telephone call. After the customer responds, the server receives it at step 330, including at least the telephone number and address of the merchant where the transaction was completed. At step 335 the server 210 determines whether multiple responses have been received from customers. This check is performed to determine whether conflicting data exists within the information dataset. As at step 340, if only a single response has been received from a customer regarding a merchant, the database is updated with such information. If multiple responses have been received regarding a merchant as at step 335, it is next determined whether the responses are conflicting as at step 345. If the responses are not conflicting, execution proceeds to step 360. Otherwise, if there are multiple conflicting customer responses, the database is updated with information most agreed upon and execution proceeds to step 360. The next payment transaction is then processed for review 365.

In an alternate embodiment of the invention, execution proceeds as above with regard to FIG. 3, but at step 370 a determination is made whether the database contains more than a maximum number of responses regarding a certain merchant. This step is performed so as to not make the amount of messages transmitted to customers unwieldy and hard for the system to bear. It also recognizes that if over the maximum number of responses has been received regarding a merchant, the database probably correctly reflects the information regarding the merchant and it is superfluous to send more messages to customers requesting further data. The maximum number of responses can be 10, 20, 50, or 75 (or even a higher or lower number). Execution then proceeds as above.

Figure 4:
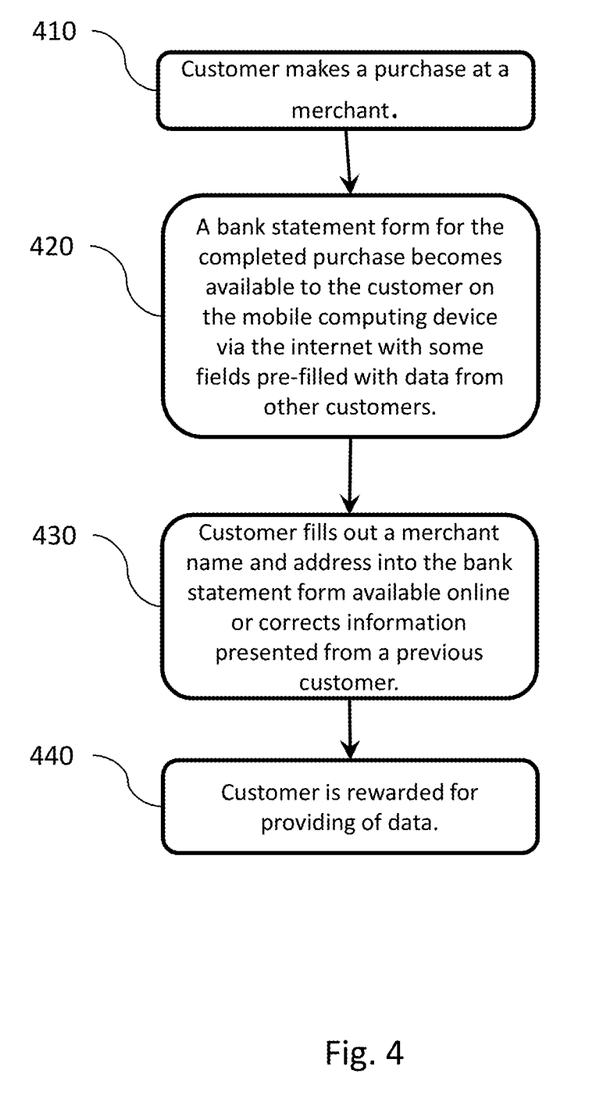
FIG. 4 illustrates a flow chart displaying an embodiment of the presently disclosed invention as experienced by a customer.

Referring to FIG. 4, there is shown a flow chart displaying an embodiment of the presently disclosed invention as experienced by a customer. The customer makes a purchase at a merchant at step 410. The server 220 tracks the completed payment transaction and messages a bank statement form for the completed purchase to the customer on his or her personal computing device (step 420). The bank statement form discussed at step 420 comes with certain fields pre-filled based upon data from other customers. The customer fills out, for example, the merchant name and address into the bank statement form available online or corrects such data presented from other customers and submits it to server 220. The customer is then provided with a link rewarding him for these details on merchant data (step 440).

Figure 5:
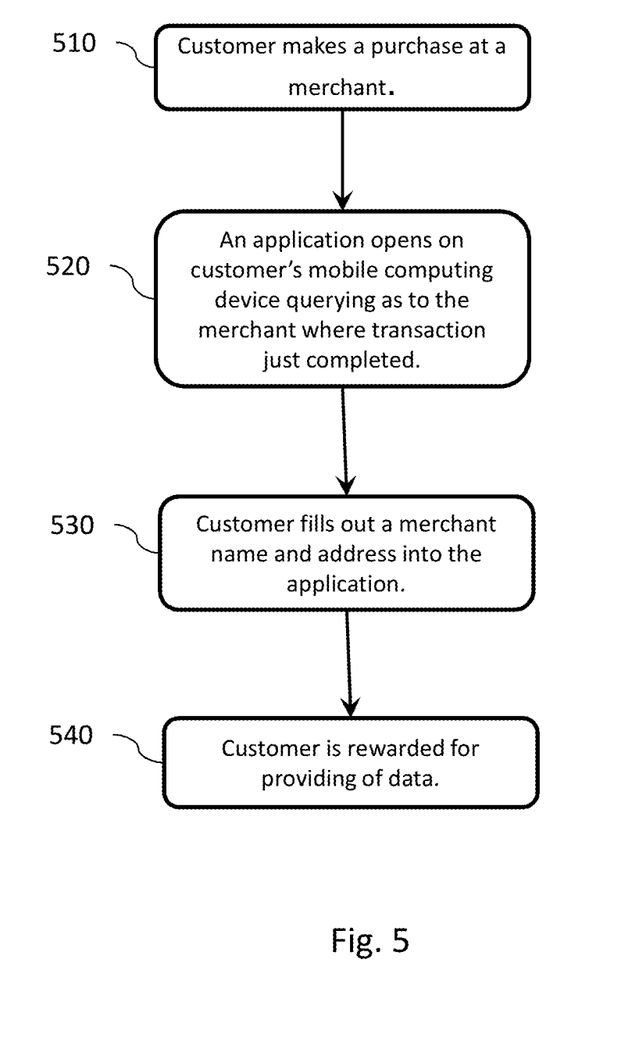
FIG. 5 illustrates a flow chart displaying an embodiment of the presently disclosed invention as experienced by a customer.

Referring to FIG. 5, there is shown a flow chart displaying an embodiment of the presently disclosed invention as experienced by a customer. The customer makes a purchase at a merchant at step 510. The server 220 tracks the completed payment transaction and transmits a message on customer's personal computing device querying as to the merchant where the transaction was just completed (step 520). The customer fills out the merchant name and address into the application and submits it to server 220 (step 530). The customer is then provided with a link rewarding him for details on this merchant data (step 540).

Figure 6:
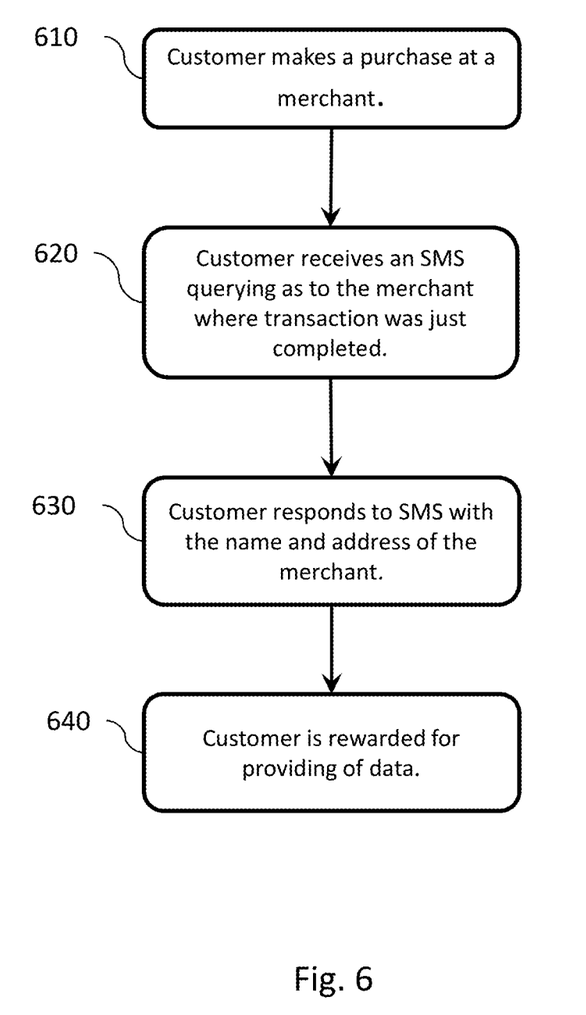
FIG. 6 illustrates a flow chart displaying an embodiment of the presently disclosed invention as experienced by a customer.

Referring to FIG. 6, there is shown a flow chart displaying an embodiment of the presently disclosed invention as experienced by a customer. The customer makes a purchase at a merchant at step 610. The server 220 tracks the completed payment transaction and transmits an SMS to the customer's personal computing device querying as to the merchant where the transaction was just completed (step 620). The customer fills out the merchant name and address into a reply SMS and submits it to server 220 (step 630). The customer is then provided with a link rewarding him for details on merchant data (step 640)

Figure 7:
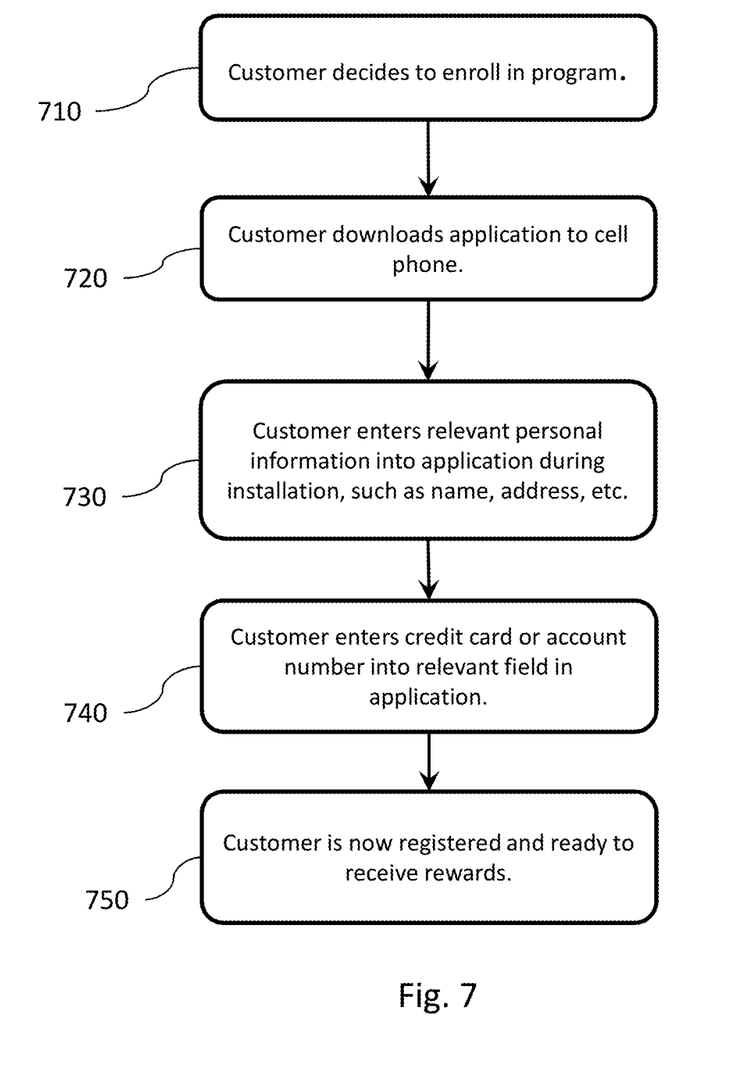
FIG. 7 illustrates a flow chart displaying an embodiment of the experience a customer receives when signing-up.

Referring to FIG. 7, there is shown a flow chart displaying an embodiment of the presently disclosed invention as experienced by a customer when signing up. The customer decides to enroll in the program and receive rewards for providing of details on merchant data (step 710). The customer then downloads the application to his or her personal computing device (step 720). The customer enters relevant personal information including name, address (step 730), and credit card or account number (step 740) into the newly installed application. The customer is now registered and ready to receive reward for providing of merchant data (step 750).

Figure 8:
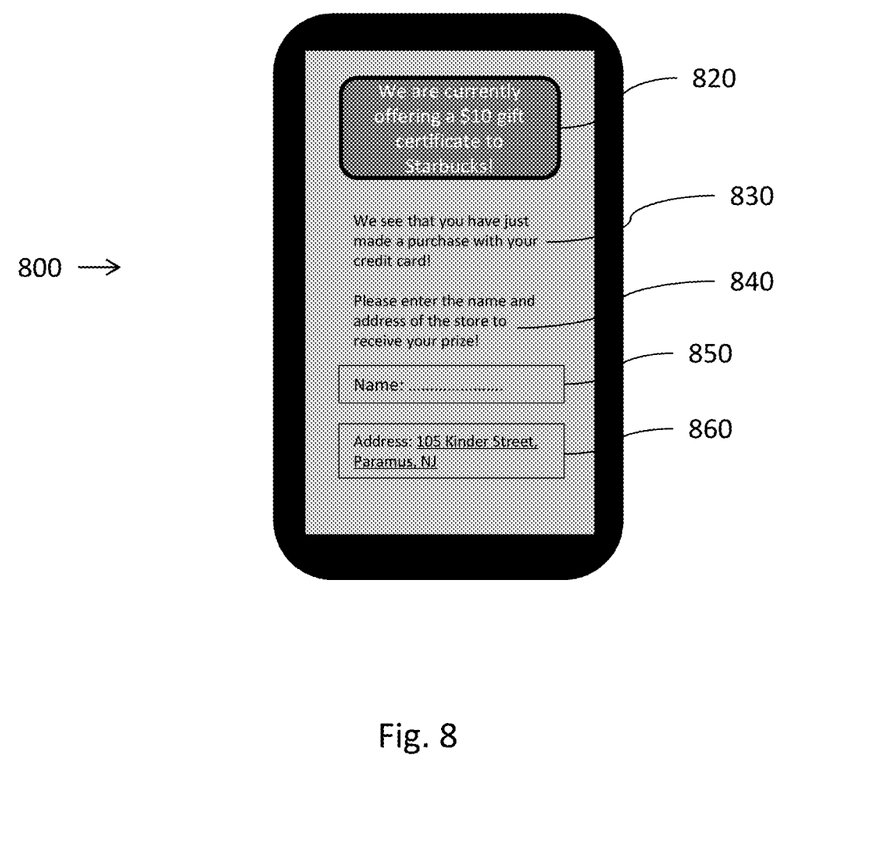
FIG. 8 illustrates an embodiment of the invention executing on a personal computing device.

Referring to FIG. 8, there is displayed an embodiment of the present invention executing on a personal computing device. Soon after a purchase is made at a merchant the customer is presented with a screen such as 800 on his or her personal computing device. Since the merchant data required of this merchant is of high-importance, a $10 gift certificate to Starbucks® is offered 820. The application opens after a purchase is made 830. A request is made to enter the name and address of the store to receive a prize 840. Fields to enter the name (850) and address (860) of the merchant are available.

As will be appreciated by one of skill in the art, the presently disclosed invention will comply with all relevant state, federal, and international laws regarding data privacy. The primary intent of the present invention is for maintenance of internal statistics.

What is claimed is:

1. A method for identifying a merchant involved in a completed payment transaction between the merchant having a transaction acquiring device and a customer, the method being carried out by a server connectable with a personal computing device over a network, comprising:
monitoring by the server, the transaction acquiring device of the merchant for a completed payment transaction between the merchant and the customer;
extracting a customer identification for the customer from said completed payment transaction;
comparing said customer identification with a list of customer identifications;
determining from said comparison, whether said customer has elected, prior to the payment transaction, to provide merchant data about the merchant;
wherein, when it is determined that the customer has elected to provide merchant data about the merchant prior to the payment transaction:
transmitting by the server a message to a personal computing device associated with the customer, the message requesting that the customer provide details of said merchant for said completed payment transaction;
receiving, by the server from the customer personal computing device, a response including at least one of a merchant name, a merchant address, a merchant phone number, and a channel used to process the transaction; and
storing the response from said customer m an information dataset of a database for the merchant;
when it is determined that the customer has not elected, prior to the payment transaction, to provide merchant data about the merchant, continuing to monitor, by the server, the transaction acquiring device of the merchant for a next transaction.

2. The method according to claim 1, wherein said information dataset includes at least one of a merchant name, a merchant address, and a merchant phone number.

3. The method according to claim 1, wherein said message comprises at least one of an SMS, a voicemail message, a voice telephone call, and a signal to open an application residing at least in-part on said customer personal computing device.

4. The method according to claim 1, wherein said customer personal computing device comprises at least one of a cellular telephone, a personal digital assistant, a lap-top computer, a personal computer, a tablet computer, and a pager.

5. The method according to claim 1, wherein if the customer has elected to provide merchant data about the merchant, said method further comprising the step of transmitting, by said server to said customer personal computing device, a link for claiming a prize after the response to said message is received from said customer.

6. The method according to claim 5, wherein said link for claiming a prize includes a link to add points to a rewards account for claiming a prize and a link for claiming a merchandise award.

7. The method according to claim 1, wherein said step of receiving further comprises receiving, by the server from the customer personal computing device, a response including at least one of the type of goods and services associated with the completed payment transaction.

8. The method according to claim 1, further comprising, prior to said extracting step, determining whether said dataset of the database for the merchant contains more than at least one of 3 messages, 10 messages, 25 messages, and 100 messages.

9. The method according to claim 1, wherein the customer identification is an account number.

10. A system for identification of a merchant involved in a completed payment transaction between the merchant having a transaction acquiring device and a customer, wherein:
a server connectable with a personal computing device over a network, the server associated with a processor executes program instructions to:
monitor the transaction acquiring device of the merchant for a completed payment transaction between the merchant and the customer;
extract a customer identification for the customer from said completed payment transaction;
compare said customer identification with a list of customer identifications;
determine from said comparison whether said customer has elected, prior to the payment transaction, to provide merchant data about the merchant;
wherein, when it is determined that the customer has elected to provide merchant data about the merchant prior to the payment transaction, the processor executes further program instructions to:
transmit a message to a personal computing device associated with the customer, the message requesting that the customer provide details of said merchant for said completed payment transaction;
receive from the customer personal computing device a response including at least one of a merchant name, a merchant address, a merchant phone number, and a channel used to process the transaction; and
store the response from said customer in said information dataset of said database for the merchant;
when it is determined that the customer has not elected, prior to the payment transaction, to provide merchant data about the merchant, the processor executes further program instructions to continue to monitor the transaction acquiring device of the merchant for a next transaction.

11. The system according to claim 10, wherein said message comprises at least one of an SMS, a voicemail message, a voice telephone call, and a signal to open an application residing at least in-part on said customer's personal computing device.

12. The system according to claim 10, wherein said customer personal computing device comprises at least one of a cellular telephone, a personal digital assistant, a lap-top computer, a personal computer, a tablet computer, and a pager.

13. The system according to claim 10, wherein if the customer has elected to provide merchant data about the merchant, the processor executes further program instructions to transmit to said customer a link for claiming a prize after the response to said message is received from said customer.

14. The system according to claim 13, wherein said link for claiming a prize includes a link to add points to a rewards account for claiming a prize and a link for claiming a merchandise award.

15. The system according to claim 10, wherein the processor executes further program instructions to receive from the customer personal computing device a response including at least one of the type of goods and services associated with the completed payment transaction.

16. The system according to claim 10, wherein the processor executes further program instructions to determine whether said dataset of the database for the merchant contains more than at least one of 3 messages, 10 messages, 25 messages, and 100 messages.

\* \* \* \* \*